Dec. 18, 1962 R. A. COOPPER ET AL 3,069,085
BINARY DIGITAL MULTIPLIER
Filed April 15, 1958
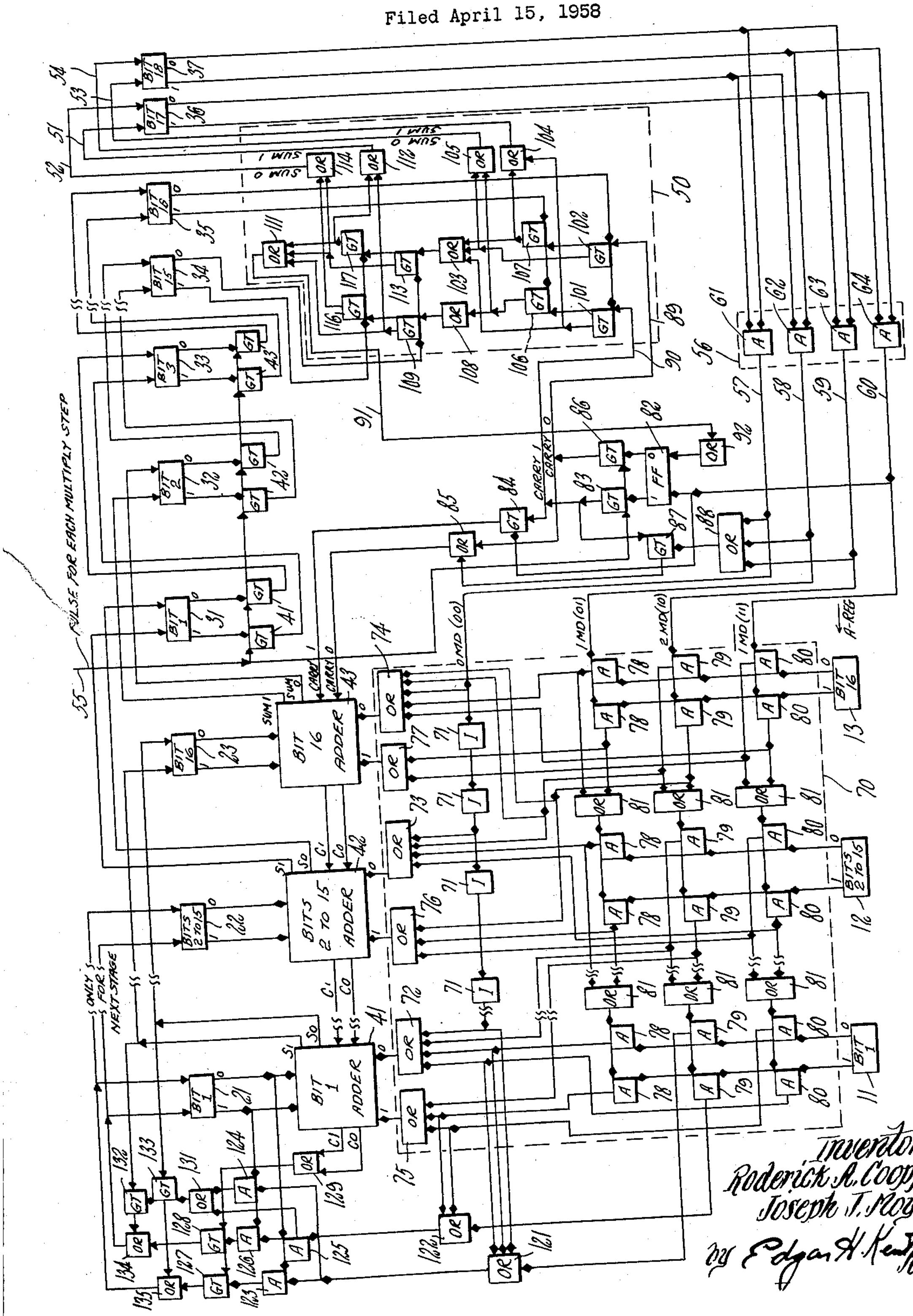
Inventors
Roderick A. Coopper
Joseph T. Moyer
by Edgar H. Kent Attys.

United States Patent Office 3,069,085
Patented Dec. 18, 1962

3,069,085

BINARY DIGITAL MULTIPLIER

Roderick A. Coopper, Hyde Park, and Joseph J. Moyer, Wappingers Falls, N.Y., assignors to International Business Machines Corporation, New York, N.Y., a corporation of New York Filed Apr. 15, 1958, Ser. No. 728,580
9 Claims. (Cl. 235—164)

This invention relates to electronic digital computers and in particular it relates to a system for performing the multiplication process in computers of this kind.

In order to increase the speed of the multiplication process in digital computers, it has been proposed that the multiplier digits be sensed a group at a time instead of one at a time as is conventional. This scheme contemplates that partial products be formed not only with the multiplicand itself, but also with multiples thereof as determined by the combinations of the multiplier digits that are present in each group. In this regard, it is clear that the logical circuitry provided to produce these multiples must not of itself introduce appreciable delays in the multiplication process or otherwise the theoretical increase in speed attainable will be largely negated.

It is an object of the present invention to provide a multiplying system of the above-mentioned character whereby an appreciable increase in speed can be realized subject substantially only to the speed limitations of the adders that are used in the system.

It is a further object of the invention to provide a multiplying system of the above-mentioned character which requires a minimum of extra equipment over and above that used in conventional multipliers.

According to the invention, the multiplier digits are sensed two at a time so that half the usual number of multiplying steps are involved. Each pair of multiplier digits specifies one of four possible combinations or multiples of the multiplicand. These are, in the binary system, 00 or zero times the multiplicand (0MD), which is zero; 01 or one times the multiplicand (1MD), that is the multiplicand itself; 10 or two times the multiplicand (2MD); and 11 or three times the multiplicand (3MD). When 0MD is specified, a zero is added to the existing partial product which consequently remains unchanged. When 1MD is specified, the multiplicand is added to the existing partial product in unmodified form. When 2MD is specified, the multiplicand is entered as an addend with its individual bits shifted to the left one place. As a result, the existing partial product is augmented by a factor of twice the multiplicand. To augment the partial product by a factor of three times the multiplicand, as required when 3MD is specified, both a subtractive and an additive procedure is carried out. On the one hand, the multiplicand is added to the existing partial product in twos complement form with the result that one times the multiplicand is effectively subtracted therefrom. Contemporaneously, a one is added to the next higher order pair of multiplier digits, that is, to the least significant one of them, preparatory to the next multiplying step. When this occurs, an additional factor of four times the multiplicand will be reflected in these multiplier digits because of the order that they occupy with respect to the preceding pair of multiplier digits. As a consequence, an extra factor of four times the multiplicand will be included in the partial product, which, together with the negative one times the multiplicand ($\overline{1MD}$), equals the requisite 3MD.

The novel features of the invention together with further objects and advantages thereof will become more readily apparent from the following description of a preferred embodiment as shown in the accompanying drawing.

In the DRAWING, the multiplying system of the present invention is shown in schematic form, the lines with conventional arrowheads carrying pulses and those with diamond-shaped terminations having D.C. levels impressed thereon.

From the drawing it will be observed that the system according to the invention employs an A register consisting of flip-flops 11, 12 and 13, an ACCUMULATOR register consisting of flip-flops 21, 22 and 23; and a B register consisting of flip-flops 31 through 37. The A register and the ACCUMULATOR register have a capacity of sixteen bits while the capacity of the B register is eighteen bits. To simplify the drawing, a plurality of bits have been ascribed to flip-flops 12 and 22, as indicated. The function of the A register is to store the multiplicand temporarily, and the function of the B register is to store the multiplier. The ACCUMULATOR register holds the partial product.

To form partial products, there is provided an adder of sixteen stages as represented by blocks 41, 42, and 43. As in the case of any multiplication system, a ripple type adder is preferred by reason of its speed of operation in carrying out the multiplication process. An example of such an adder together with storage registers of like character as those aforementioned is to be found in U.S. Patent No. 2,994,478, issued August 1, 1961.

The general arrangement of the ACCUMULATOR register and the B register is that of a single register wherein shifts to the right occur two places at a time. Thus, the sum one ($S_1$) and sum zero ($S_0$) lines from the bit one-adder stage 41 are connected to the respective one and zero inputs of the bit three flip-flop in the ACCUMULATOR register. The $S_1$ and $S_0$ lines from the bit two-adder stage 42 are connected to the respective one and zero inputs of the bit 4 flip-flop in the ACCUMULATOR register and so forth. After the bit 16 flip-flop 23, the arrangement is continued with the bit 1 flip-flop 31 and the bit 2 flip-flop 32 in the B register receiving the sum lines from the bits 15 and 16 adder stages, respectively.

In the B register, the one and zero output lines from the bit 1 flip-flop 31 are connected to the respective one and zero input lines of the bit 3 flip-flop 33 by way of gates 41; the output lines from the bit 2 flip-flop 32 are connected to the inputs of the bit 4 flip-flop by way of gates 42; and the same arrangement is continued for all output lines from the flip-flops preceding the bit 15 flip-flop 34. The bit 15 flip-flop 34 and the bit 16 flip-flop 35 are adapted to have their contents transferred to the bit 17 and bit 18 flip-flops 36 and 37, respectively, either in like manner as they stand in flip-flops 34 and 36, or as modified by the addition of a one. To this end, there is provided within the dotted line 50 a logical circuit responsive to the respective output lines from the bit 15 and 16 flip-flops 34 and 35, and having as an output a pair of sum lines 51 and 52 to control the state of the bit 17 flip-flop 36; and a pair of sum lines 53 and 54 to control the state of the bit 18 flip-flop 37. A pulse on a line 55 samples the gates 41–43 and initiates the transfer action of the logical circuit 50. The overall effect of the resulting double shift right is to eliminate the least significant pair of multiplier digits two at a time to make room for the partial product as it expands into the B register.

To sense each pair of multiplier digits before they are lost, the output lines from the bits 17 and 18 flip-flops 36 and 37 are connected to a decoder enclosed by the dotted line 56. The function of the decoder is to produce a D.C. level on one of four output lines 57–60 depending on the sense of the combination of digits in the bit 17 and 18 flip-flops. This result is accomplished by a simple combination of AND circuits 61–64. Thus, the zero output lines from the bit 17 and 18 flip-flops are connected to AND circuit 61; the zero output line from the bit 17 flip-flop 36 and the one output line from bit 18 flip-flop 37 are connected to AND circuit 62; the one output line from bit 17 and the zero output line from bit 18 are connected to AND circuit 63; and the one output lines from both bits 17 and 18 are connected to AND circuit 64.

The outputs from the AND circuits 61–64 are applied by way of lines 57–60 to a product generator enclosed by the dotted line 70. Product generator 70 serves to provide as an addend to the adder stages, one of four possible multiples or combinations of the multiplicand according to which of the lines 57–60 is energized. The four possible multiples are zero times the multiplicand (0MD), one times the multiplicand (1MD), two times the multiplicand (2MD), and minus one times the multiplicand ($1\overline{MD}$). To generate 0MD, the level on line 57 is passed to the zero inputs of the adder with suitable delays 71 between stages to give the adder time to function properly. The zero inputs to the adder stages 41–43 are conditioned by OR circuits 72–74, respectively. To produce 1MD, the level on line 58 is anded with the one and zero outputs from the flip-flops in the A register, and applied to the one and zero inputs of the adder according to the sense of the A register or multiplicand bits. In the case of the one inputs to the adder stages 41–43, OR circuits 75–77, respectively, are utilized to supply the level. The zero inputs, on the other hand, are supplied by OR circuits 72–74, aforementioned. To produce 2MD, the level on line 59 is anded with the one and zero outputs of the A register flip-flops and passed to the adder stage of next higher order by way of OR circuits 72–77. Finally, $1\overline{MD}$ is produced by anding the level on line 60 with the one and zero outputs of each flip-flop in the A register and applying the level to the corresponding stages of the adder in reverse sense, that is in complement form. As in the previous cases, the level is applied by way of OR circuits 72–77. The necessary AND circuits to produce these AND functions are as shown in the drawing, namely those for 1MD are designated 78, those for 2MD, 79, and those for $1\overline{MD}$, 80. There have also been provided between the individual pairs of AND circuits 78–80, associated with the flip-flops in the A register, OR circuits 81 to maintain the level supplied by way of lines 58–60. Each of these OR circuits is arranged to reproduce the appropriate D.C. level and apply it to the succeeding pair of AND circuits. Since their function is identical, these OR circuits have been designated by the single numeral.

To produce $1\overline{MD}$ according to the invention, it is also necessary to carry one to the bit 16 adder stage 43. For this purpose, there is provided a flip-flop 82 having its one input connected to the line 60, that is the $1\overline{MD}$ line, and its one output applied to the carry one line of adder stage 43 through gates 83 and 84. Gate 83 is sampled by a pulse on line 55 and gate 84 is conditioned by the same level which conditions the one input of the flip-flop 82. In the absence of a carry one to the bit 16 adder stage 43, a carry zero is provided by way of an OR circuit 85. The input to OR circuit 85 is supplied in one of two ways depending upon the state of the flip-flop 82. If the flip-flop is in the zero state, a gate 86 is conditioned and an output pulse is produced thereby when the gate is sampled by a pulse on the line 55. Alternatively, when the flip-flop 82 is in the one state, the output produced by gate 83 in response to a pulse on line 55 is used to sample a gate 87 whose output is applied to OR circuit 85. Gate 87 is conditioned by an OR circuit 88 which is served by a D.C. level on any of the lines 57, 58, and 59.

In addition to the outputs from the bit 15 and 16 flip-flops 34 and 35 of the B register, the logical circuit 50 is responsive to the outputs from the gates 83 and 86 which occur in the alternative. When there is an output from gate 86 on the line 89, or carry zero line, the contents of the bit 15 and 16 flip-flops are transferred intact to the bit 17 and 18 flip-flops by way of the sum lines 51–54. When there is an output from gate 83 on the other hand, the line 90, or carry one line, is pulsed with the result that the contents of the bit 15 and 16 flip-flops are transferred to bits 17 and 18 as modified by the addition of a one to bit 16, and a carry into bit 15, as required. This is shown by the following table:

| Bits | 15 | 16 | 17 | 18 |
|---|---|---|---|---|
| (Carry one line energized) | 0 | 0 | 0 | 1 |
| | 0 | 1 | 1 | 0 |
| | 1 | 0 | 1 | 1 |
| | 1 | 1 | 0 | 0 |

As indicated above, when the contents of the bit 15 and 16 flip-flops are both one, the result is that a zero is placed in both the bit 17 and 18 flip-flops. This is the only condition under which a line 91 from the circuit 50 is not pulsed. Line 91 is connected to the zero input of flip-flop 82 through OR circuit 92 so that the flip-flop 82 remains set in the one state in this case. The result is that a carry one pulse is again applied to the logical circuit 50 after the contents of the bit 15 and 16 flip-flops have been replaced by those of the bit 13 and 14 flip-flops and the circuit 50 is again conditioned to add a one irrespective of which level from the decoder 56 is up. In this way, it is insured that the carry one is appropriately reflected in the multiplier.

The logical circuit 50 is seen to include gates 101 and 102 conditioned by the zero side of flip-flop 35, and sampled by the carry one and carry zero lines 90 and 89, respectively. The output of gate 101 is passed to an OR circuit 103 and also to an OR circuit 104 whose output provides a one input to flip-flop 37. The output of gate 102 is likewise passed to OR circuit 103 as well as to another OR circuit 105 which provides a zero input to flip-flop 37.

Connected to the one side of flip-flop 35 is a second pair of gates 106 and 107 which are likewise sampled by the carry one and carry zero lines 90 and 89, respectively. Gate 106 has its output connected to OR circuit 105 and gate 107 has its output connected to OR circuit 104. In addition, gate 107 provides still a third input to OR circuit 103, and gate 106 provides the sole input to an OR circuit 108, the latter OR circuit being used merely for delay purposes.

The output of OR circuit 108 samples a gate 109 which is conditioned by the zero side of flip-flop 34 and has its output applied to an OR circuit 111 and an OR circuit 112. The output of OR circuit 103 samples a gate 113 which is likewise conditioned by the zero side of flip-flop 34 and has its output applied to an OR circuit 114 and to OR circuit 111.

Finally the circuit includes still another pair of gates 116 and 117 which are sampled by the outputs of OR circuits 108 and 103, respectively. Gates 116 and 117 are conditioned by the one side of flip-flop 34 and have their outputs applied to OR circuits 114 and 112, respectively. As shown, OR circuit 112 provides a one input to flip-flop 36, and OR circuit 114 provides a zero input. In addition, gate 117 has an output to OR circuit 111, which provides the zero input to the carry flip-flop 82. As in the case of OR circuit 108, OR circuit 92 serves merely as a delay for this latter zero input.

In forming partial products according to the invention, it is necessary to assign not just one but a pair of sign bits of like sense to the multiplicand as it stands in the A register, and to the partial products as they are generated. This latter function is performed by the circuit at the upper left of the drawing which operates by the rule that when the sign bits entered from the A register and ACCUMULATOR register agree, their sign is the correct one to apply. Conversely, when the sign bits entered from the A register and ACCUMULATOR register disagree, it is the sum of their sign bits (including carries from the bit 2 adder 42) that is assigned. In determining which rule to follow, only the bit derived from flip-flop 11 in the A register and the bit held in flip-flop 21 of the ACCUMULATOR register are taken into account. In the case of 0MD, 1MD and $1\overline{MD}$, these are the bits being entered into the bit 1 adder 41.

As shown in the drawing, this circuit comprises an OR circuit 121 having as inputs all the add zero lines to adder 41 by way of OR circuit 72, and an OR circuit 122 having as inputs all the add one lines to adder 41 by way of OR circuit 75. The output of OR circuit 121 is anded with the zero side of flip-flop 21 and in an AND circuit 123 and also with the one side of flip-flop 21 in an AND circuit 124. Similarly, the output of OR circuit 122 is anded with the zero side of flip-flop in an AND circuit 125 and with the one side of flip-flop 21 in an AND circuit 126. The outputs of AND circuits 123 and 126 condition a pair of gates 127 and 128, respectively, each of which is sampled by the output of an OR circuit 129. The inputs to OR circuit 129 comprise the carry one and carry zero lines from the bit one adder stage 41. The significance of these carries, is, therefore, lost at the output of OR circuit 129 but this is of no moment since they are used only as a source of pulses for sampling the gates 127 and 128.

AND circuits 124 and 125 have their outputs applied to an OR circuit 131 which in turn conditions another pair of gates 132 and 133. Gate 132 is sampled by the sum one output of adder stage 41 while gate 133 is sampled by the sum zero output. Finally there is provided an OR circuit 134 which has as its inputs the outputs of gates 128 and 132; and an OR circuit 135 to which the outputs of gates 127 and 133 are applied. OR circuit 134 provides a one input for adder stage 21 and the next lower order adder stage, while OR circuit 135 provides the zero inputs to these adder stages.

The overall operation of the system according to the present invention will best be understood in terms of an illustrative example of a multiplication process. Such an example is outlined below, the number 0.110110 (27/32) being the multiplicand (MD), and the number 0.011110 (15/32) being the multiplier (MR):

| | | | |
|---|---|---|---|
| 00.00 00 00 | 01 11 10 00 | | Pulse 1 |
| 00.00 00 00 | | Select 0MD and add | |
| 00.00 00 00 | | | |
| 00.00 00 00 | 00 01 11 10 | Shift Right 2 (automatic) | |
| 01.10 11 00 | | Select 2MD and add | Pulse 2 |
| 01.10 11 00 | | | |
| 00.01 10 11 | 00 00 01 11 | Shift Right 2 (automatic) | |
| 11.00 10 01<br>1 | | Select 1's complement of MD and add with carry one line activated. | Pulse 3 |
| 11.10 01 01 | | | |
| 11.11 10 01 | 01 00 00 10 | Shift Right 2 (automatic) adding (01) to the lowest order pair of MR digits (01). | |
| 01.10 11 00 | | Select 2MD and add | Pulse 4 |
| 01.10 01 01 | | | |
| 00.01 10 01 | 01 01 00 00 | Shift Right 2 (automatic) | |

When the first pulse occurs on line 55 in this example, there will be a level on line 57 owing to the fact that flip-flops 36 and 37 are initially cleared. The flip-flop 82 is also cleared initially so that a carry zero pulse is passed to both the bit 16 adder stage 43 and to the circuit 50. The sense of the carry zero pulse to the adder stage 43 is to initiate an add 0MD operation which leaves the ACCUMULATOR registers 21–23 in their initial cleared states. The sense of the carry zero pulse on line 89 to the circuit 50 is to condition the circuit 50 to transfer the contents of flip-flops 34 and 35 to flip-flops 36 and 37, respectively, without change. Since it is the last two digits (10) of the multiplier that are held in flip-flops 34 and 35, these digits are accordingly transferred to the flip-flops 36 and 37, with the result that the 2MD line 59 becomes energized.

When a second pulse occurs on the line 55, therefore, the line 59 will have been energized, and as a consequence there will be a carry zero pulse to adder stage 43 which is effective to enter the contents of the A register into the adder with the individual bits thereof shifted to the left one place. The partial product formed by the adder is 01.101100, which is automatically entered in the combined ACCUMULATOR and B registers with a double shift right. Also the multiplier in the B register is shifted two places to the right and a pulse is produced on line 91, but the latter has no effect since flip-flop 82 is already in the zero or cleared state.

The sign bits assigned to flip-flops 21 and 22 of the ACCUMULATOR register are zero which comes about as follows. In response to the level on the 2MD line 59, AND circuit 79 associated with the bit one flip-flop 11 in the A register produces a level at OR circuit 121. As a consequence, gate 127 is conditioned, and passes a pulse to the zero inputs of flip-flops 21 and 22. Gate 127 is caused to pass this pulse to the zero inputs of flip-flops 21 and 22 on signal from one of the carry lines associated with the bit one adder stage 41.

When a third input pulse occurs on line 55, the contents of flip-flops 36 and 37 correspond to the second pair of multiplier digits to be sensed, namely (11). With this combination of digits, the line 60 is energized and flip-flop 82 is in its one state. Accordingly, as a result of the third input pulse, a carry one pulse is entered into the adder stage 43 which causes the multiplicand to be added to the partial product in twos complement form. This is the same as minus one times the multiplicand or $1\overline{MD}$. Since the complement of the left-most bit of the multiplicand is a one, the left-most bit of the existing partial product is a zero, and there is no carry into the bit one adder stage 41, the sign one is assigned to the bit 1 and 2 adder stages. OR circuit 122 and AND circuit 126 function in this case to condition gate 128 which will be effective to produce the required sign one on signal from the carry output from the bit one adder stage 41.

Also as a result of the third input pulse, the carry one line 90 is energized so that the contents of flip-flops 34 and 35 are transferred to flip-flops 36 and 37 with a one added thereto. In other words, instead of (01) being placed in flip-flops 36 and 37, (10) is placed therein so that the sense of these digits will reflect an additional four times the multiplicand as referred to the previous lower ordered pair of multiplier digits. With 10 in the flip-flops 36, 37, the line 59 is energized, and the operation that follows upon the occurrence of the fourth input pulse on line 55 is the same as that described in connection with the second input pulse. Following the automatic shift right, the contents of the combined ACCUMULATOR and B registers will be as shown at the end of the example, namely, 00.01100101010000, which is the correct answer, disregarding the two least significant digits.

In the example shown, the last two multiplier digits (01) allowed a correct sum number and sum binary point to take place. If these multiplier digits had been (11), the $1\overline{MD}$ line 60 would be activated and a one would be stored in flip-flop 82, necessitating one additional multiply step. This additional step, as in the case of each previous step, would end with an automatic shift which would have the effect of moving the numerical result two places too far to the right. Hence, one alternative is to provide indiscriminately for such an additional step and to read out the answer on the basis that the binary point is between the fourth and fifth accumulator stages. Alternatively, a sum shift left of two digit places may be provided for whenever there has been such an additional step.

Although the system of the invention has been designed with specific types of adders and storage registers in mind, those skilled in the art will recognize that the logical principles of the invention are equally applicable to various such multiplier elements. Also, the logical principles may be applied in different ways to like elements as have been described herein. Therefore, the invention should not be deemed to be limited to what has been described in detail herein, by way of example, but should be deemed to be limited only by the scope of the appended claims.

What is claimed is:

1. A binary multiplier comprising a first register having a plurality of digit stages for storing signals representative of a multiplicand,
an adder having a plurality of digit stages,
first means coupling said first register to said adder for selectively generating and transferring in parallel to said adder signals representing selected multiples of the number stored in said first register including a multiple consisting of minus *n* times the number stored in said first register where *n* is a whole number,
a second register having a plurality of digit stages for storing signals representative of a partial product,
second means coupling said adder stages to corresponding stages of said second register,
a third register having a plurality of digit stages for storing signals representative of a multiplier, and
third means coupled to said third register for sensing signals stored in successive groups of digit stages of said third register in order of increasing multiplier digit significance,
the signals in each group being sensed simultaneously,
said third means actuating said first means according to the value of each sensed group of multiplier digits to transfer signals related to said multiplicand to said adder for generating signals representative of a partial product value for storage in said second register.

2. A binary multiplier comprising a first register having a plurality of digit stages for storing signals representative of a multiplicand,
an adder having a plurality of digit stages,
first means coupling said first register to said adder for selectively generating and transferring in parallel to said adder signals representing selected multiples of the number stored in said first register including a multiple consisting of minus *n* times the number stored in said first register where *n* is a whole number,
a second register having a plurality of digit stages for storing signals representative of a partial product,
second means coupling said adder stages to corresponding stages of said second register,
a third register having a plurality of digit stages for storing signals representative of a multiplier,
means for transferring to a predetermined pair of digit stages of said third register signals representing successive pairs of multiplier digits,
and third means coupled to said third register for simultaneously sensing the signals stored in said predetermined pair of digit stages,
said third means actuating said first means according to the value of each sensed pair of multiplier digits to transfer signals representing a multiple of said multiplicand to said adder for generating signals representative of a partial product for storage in said second register.

3. A binary multiplier comprising a first register having a plurality of digit stages for storing signals representative of a multiplicand,
an adder having a plurality of digit stages,
first means coupling said first register to said adder for selectively generating and transferring in parallel to said adder signals representing multiples of the multiplicand (MD) stored in said first register selected from a group of multiples consisting of 0MD, 1MD, 2MD and $1\overline{MD}$ (minus 1 times the multiplicand),
a second register having a plurality of digit stages for storing signals representative of a partial product,
second means coupling said adder stages to corresponding stages of said second register,
a shift register having a plurality of digit stages for storing signals representative of a multiplier and transferring to a predetermined pair of said digit stages signals representing successive pairs of multiplier digits,
third means coupled to said shift register for simultaneously sensing signals stored in said predetermined pair of digit stages,
said third means actuating said first means according to the value of each sensed pair of multiplier digits to transfer signals representing a multiple of said multiplicand to said adder for generating signals representative of a partial product for storage in said second register,
selectively operable means to alter the signals representing pairs of digits transferred to said predetermined pair of digit stages so as to denote an increase of one in their value,
and means to control the operation of said means to alter signals in response to the signals representing $1\overline{MD}$.

4. A binary multiplier comprising a first register having a plurality of digit stages for storing signals representative of a multiplicand,
an adder having a plurality of digit stages,
first means coupling said first register to said adder for selectively generating and transferring in parallel to said adder signals representing selected multiples of the number stored in said first register including a multiple consisting of minus *n* times the number stored in said first register where *n* is a whole number,
a second register having a plurality of digit stages for storing signals representative of a partial product,
second means coupling said adder stages to corresponding stages of said second register,
a third register having a plurality of digit stages for storing signals representative of a multiplier,
third means coupled to said third register for sensing signals stored in successive groups of digit stages of said third register in order of increasing multiplier digit significance,
the signals in each group being sensed simultaneously,
said third means actuating said first means according to the value of each sensed group of multiplier digits to transfer signals representing a multiple of said multiplicand to said adder for generating signals representative of a partial product value for storage in said second register,
and including means to transfer to said adder signals representing a multiplicand multiple in excess of the multiplicand multiple indicated by a group of multiplier digits whenever all the digits in a sensed group of multiplier digits are ones.

5. A multiplier according to claim 4 wherein said third means includes a summing circuit selectively operable on signals representing groups of multiplier digits, and a carry circuit to produce signals representative of the carries for controlling the operation of said summing circuit.

6. The multiplier as claimed in claim 5 wherein said third register is a shift register adapted to transfer to predetermined bit positions succeeding groups of signals representing multiplier digits in accordance with the logic of said summing circuit and said third means includes said carry circuit, and a decoder to determine the sense of signals representative of the digits transferred to said predetermined bit positions to control the actuation of said first means.

7. The multiplier as claimed in claim 6 wherein said carry circuit includes a storage device responsive to the signals representing the multiplier digits in said predetermined bit positions.

8. A binary multiplier comprising a first register having a plurality of digit stages for storing signals representative of a multiplicand, an adder having a plurality of digit stages, first means coupling said first register to said adder for selectively generating and transferring in parallel to said adder signals representing selected multiples of the number stored in said first register including a multiple consisting of $n$ times the complement of the number stored in said first register where $n$ is a whole number, a second register having a plurality of digit stages for storing signals representative fo a partial product, a second means coupling said adder stages to corresponding stages of said second register, a shift register having a plurality of digit stages for storing signals representative of a multiplier, means to actuate said shift register to transfer to predetermined digit stages thereof signals representative of successive groups of multiplier digits, third means coupled to said predetermined stages of said shift register for simultaneously sensing signals stored in said predetermined digit stages, said third means actuating said first means according to the value of each sensed group of multiplier digits to transfer signals representing a multiple of said multiplicand to said adder for generating signals representative of a partial product value for storage in said second register, and including means to transfer to said adder signals representing a multiplicand multiple in excess of the multiplicand multiple indicated by a group of multiplier digits whenever all the digits in a sensed group of multiplier digits are ones.

9. The multiplier as claimed in claim 8 and further including means responsive to data sign information stored in said first and second registers for applying sign information to the digit stages of said second register corresponding in number to said predetermined digit stages of said shift register.

References Cited in the file of this patent

UNITED STATES PATENTS

| | | |
|---|---|---|
| 2,829,827 | Bergfors | Apr. 8, 1958 |
| 2,834,543 | Burkhart | May 13, 1958 |
| 2,856,126 | Kilburn | Oct. 14, 1958 |

FOREIGN PATENTS

| | | |
|---|---|---|
| 788,259 | Great Britain | Dec. 23, 1957 |

OTHER REFERENCES

"Synthesis of Electronic Computing and Control Circuits," Harvard University Press, date of publication May 17, 1951 (pages 195 to 204 total of six pages as photostated).

UNITED STATES PATENT OFFICE

CERTIFICATE OF CORRECTION

Patent No. 3,069,085 December 18, 1962

Roderick A. Coopper et al.

It is hereby certified that error appears in the above numbered patent requiring correction and that the said Letters Patent should read as corrected below.

Column 9, line 7, after "said", second occurrence, insert -- carry circuit, and said --; line 8, strike out "said carry circuit, and"; same column 9, line 28, for "fo" read -- of --.

Signed and sealed this 14th day of January 1964.

(SEAL)
Attest:

ERNEST W. SWIDER

Attesting Officer

EDWIN L. REYNOLDS

Acting Commissioner of Patents